L. J. WESTNESS.
PNEUMATIC TIRE.
APPLICATION FILED JULY 2, 1906.
905,257.
Patented Dec. 1, 1908.
3 SHEETS—SHEET 1.
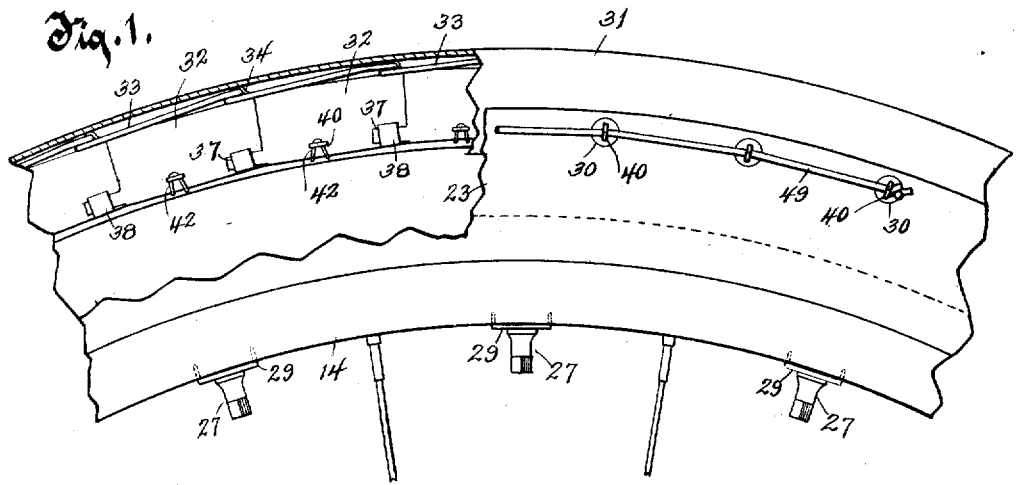
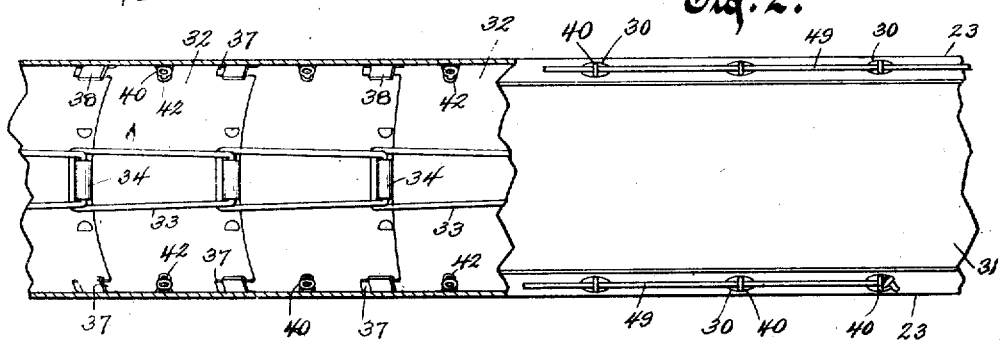
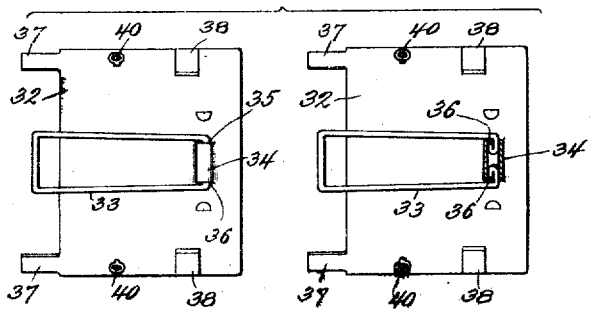

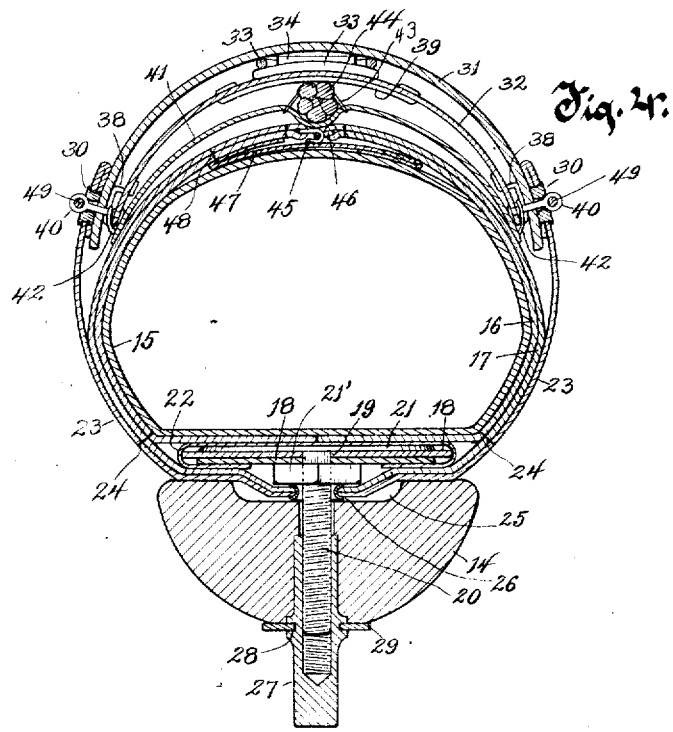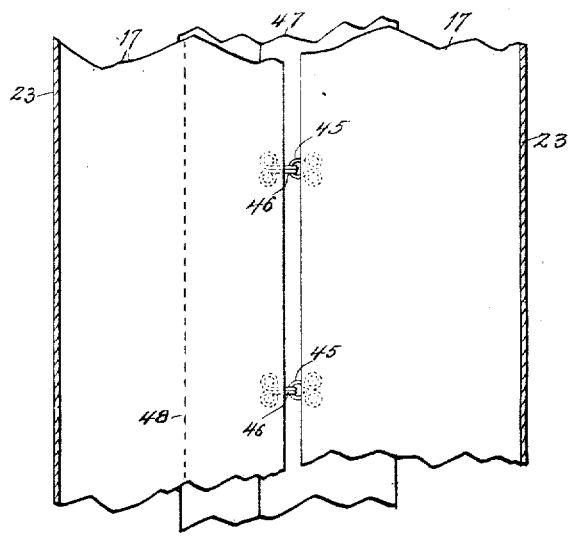

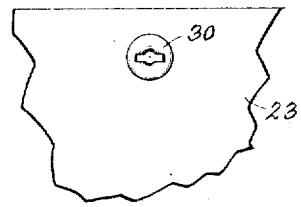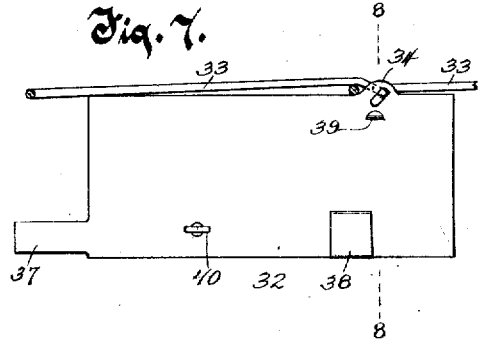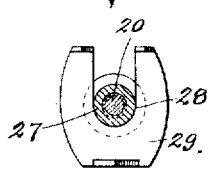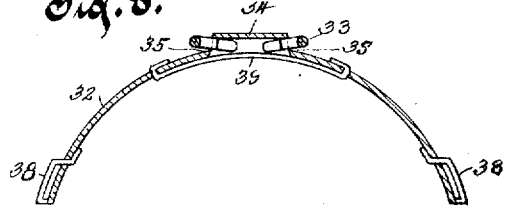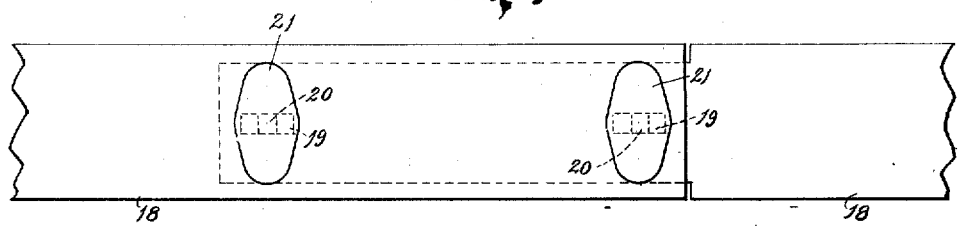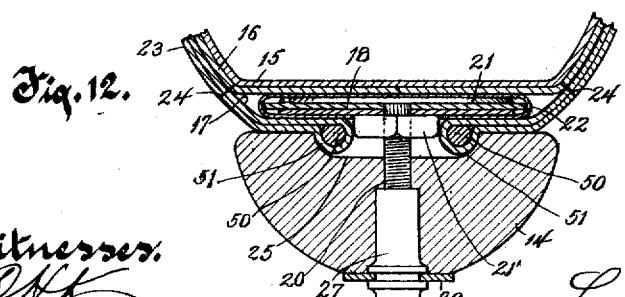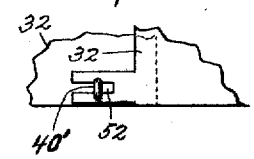

UNITED STATES PATENT OFFICE.

LOUIS J. WESTNESS, OF MILWAUKEE, WISCONSIN.

PNEUMATIC TIRE.

No. 905,257.　　　Specification of Letters Patent.　　　Patented Dec. 1, 1908.

Application filed July 2, 1906. Serial No. 324,294.

*To all whom it may concern:*

Be it known that I, LOUIS J. WESTNESS, residing in Milwaukee, in the county of Milwaukee and State of Wisconsin, have invented new and useful Improvements in Pneumatic Tires, of which the following is a description, reference being had to the accompanying drawings, which are a part of this specification.

My invention has relation to improvements in pneumatic tires.

The primary object of the invention is to provide an improved form of pneumatic tire especially intended for use in connection with automobiles, and other heavy vehicles, and also well adapted for use in connection with the wheels of motor cycles, bicycles, and in fact in connection with vehicles of any description where pneumatic tires are desirable, the said improved form of tire having the particular advantages and functions as will be hereinafter more fully set forth.

In the accompanying drawings, Figure 1 is a side elevation of a fragment of a wheel, parts broken away to show interior construction; Fig. 2 is a plan view of Fig. 1, with the outer tread covering broken away; Fig. 3 is a plan view of two of the metal guards detached from each other, one of said guards being partly in section; Fig. 4 is a cross section of the complete tire; Fig. 5 is a view of the tire, the canvas 23 in section, and all parts connected to said canvas removed; Fig. 6 is a view of a fragment of the outer canvas 23, showing the eyelet therein; Fig. 7 is a side view of one of the metal shields, part in section; Fig. 8 is a cross section on the line 8—8 of Fig. 7; Fig. 9 is a view of a fragment of the inner metal clamping band; Fig. 10 is an edge view of Fig. 9, part in section; Fig. 11 is a horizontal section through the means or mechanism for securing the tire to the rim, and looking upwardly; Fig. 12 is a section through a portion of the tire, showing a modified form of the means for clamping the tire to the rim; and Fig. 13 is a view of a modified form of the means for connecting one metal shield section to the other.

In the accompanying drawings, the numeral 14 indicates the rim of the wheel, around which is arranged the pneumatic tire. Referring to the tire, the numeral 15 indicates the inner rubber tube thereof. This tube is surrounded by a double thickness of canvas, the inner thickness of said canvas being indicated by the numeral 16, and the outer thickness thereof by the numeral 17. At the inner portion of the tire the two thicknesses of this canvas are spaced apart, and in this space is fitted a metal band, forming part of the mechanism for clamping the tire to the wheel rim. This band is composed of a series of overlapping segments 18. The overlapping portions of the segments are provided with registering elongated square openings 19 (see particularly Fig. 9). Screws 20 pass through these square openings, and said screws at diametrically opposite points are without threads and squared in order to fit the squared openings and thereby prevent the turning of the screws in the openings. These openings 19 are elongated for the purpose of permitting the lengthening of the band, which is necessary in order to compensate for the different pressures to which the tire is subjected, and to also facilitate the dismantling of the tire, or gaining access to the interior thereof. The upper ends of the screws above the overlapping portions of the band segments are provided with enlargements or heads 21, and turning on the screws below the overlapping portions of the band segments are nuts 21'. These nuts when turned serve to clamp the overlapping ends of the band segments or sections firmly between said nuts and the heads 21 of the screws. In order to prevent the sections of the metallic band from injuring the two thicknesses of canvas 16 and 17, the outer side of said metallic band is covered with another canvas 22 to protect the inner thickness 16, and this canvas is turned around the edges of the band, and thence beneath said band a sufficient distance to protect the outer thickness of canvas 17.

Covering the outer thickness 17 of the canvas except at the tread of the tire is another canvas 23, which is stitched at the points 24, 24 to the two thicknesses 16 and 17. Midway between these two points of stitching, and at a point opposite to the center of the central depressed portion 25 of the rim, the thickness 17 of the canvas and the outer canvas 23 are provided with a series of registering openings in which are fitted eyelets 26. Through these eyelets the screws 20 pass and turn into elongated nuts 27, the outer ends of said nuts projecting beyond the inner side of the rim, and preferably being squared for the convenient application thereto of a suitable turning tool. Each of these elongated nuts are provided adjacent to the inner side of the rim with an annular recess 28, which recess receives the furcate members of a bifurcated nut locking plate 29, shown in detail in Fig. 11. The extremities of the furcate arms or members of this locking plate are turned at right angles, and when the plates are forced into place, the angularly bent ends of the furcate members are driven into the wooden rim, and it is obvious that the nuts are thus prevented from working outwardly. The nuts referred to, the locking plates therefor, the screws 20 with the heads 21 at the inner ends thereof, the nuts 21' turned on to the screws, and the metallic band composed of the segments 18 form the means for securely but detachably connecting the tire to the rim.

The outer ends or flaps of the canvas 23 are folded under, as clearly shown in Fig. 4, and provided with a series of openings through the double thickness formed by the folds, and said openings have eyelets 30 fitted therein, shown in detail in Fig. 6.

The outer tread of the tire is formed of suitable material 31, preferably leather, and the inner edges of this material pass beneath the infolded outer edges of the canvas 23.

Beneath the outer leather covering 31 is a metallic protecting shield arranged entirely around the tire, and composed of a series of segments or plates 32, shown in detail in Fig. 3. Each one of these plates or segments is detachably connected to the next adjacent plate, preferably by means of a bail 33. I also prefer to provide a means for detachably pivoting each bail to its plate, this means being shown in detail in Figs. 3, 7 and 8. Referring to these figures, it will be seen that each plate is provided near one transverse edge with an embossed or raised portion 34 having inclined openings 35, 35 at opposite ends thereof. The ends of the bail which enter these openings are bent substantially at right angles to the inclination of the openings so that when said bent ends are inserted in the openings, and the bails turned to their proper position, that is, lying across the width of the shield section, as illustrated in Figs. 2, 3 and 7, the said bent ends of the bail will then be against inturned portions or stops 36, 36, as shown on the right hand plate illustrated in Fig. 3. In this position of the bail, it will be obvious that it is impossible to release the ends of said bail from engagement with the openings 35. When, however, it becomes necessary, for any reason, to release a bail, all that is necessary is to turn the bail from the position shown in Figs. 2, 3 and 7, and this turning backwardly of the bail brings the angles of the bent ends of said bails coincident with the angles of the openings 35, and hence the bent ends of the bails can then be readily released.

As shown most clearly in Fig. 2, each plate or segment of the metallic shield fits at one edge beneath the edge of an adjacent plate or segment, and the opposite edge of the said plate above the edge of the other adjacent plate. The bails or loops are connected by having the looped end of each bail beneath the pivoted end of the next succeeding bail at a point just in advance of the embossed or raised portion 34. One edge of each plate is also provided with projecting tongues 37, 37 which slidingly fit in pockets 38, 38 in the next succeeding plate. By reason of the described construction of the metallic puncture-proof shield, the sections or segments thereof are flexibly held together, so that they may give with the different compressions and expansions to which the pneumatic tire is subjected.

In order to prevent the bent pivoted ends of the bails 33 from injuring the portion of the tire therebeneath, I provide small metallic plates 39 beneath each segment or section of the shield, each plate covering the bent ends of the bails which are beneath a section 32, and in order to secure or clench these protecting plates or guards, I bend the opposite ends thereof, and pass said bent ends through openings in the shield plate, and bend the extremities of the said ends down against the outer side of the shield plate, as most clearly shown in Fig. 8.

The outer folded under ends of the canvas 23, the longitudinal edges of the outer leather tread covering 31, and the longitudinal edges of the shield plates or sections 32 are secured together by means of eyed shanks 40, said shanks passing through the eyelets 30, through the outer leather covering 31, and pivotally mounted at their inner ends in the shield plates or sections 32. The eyes of these shanks, in order to releasably secure the parts referred to together, are turned athwart or transverse to the length of the elongated eyelets 30, as clearly shown in Fig. 4.

Beneath the metallic shield plates or segments 32 is a canvas layer 41, and the outer edges of this layer are secured to the shield plates or segments by means of a thread 42 passed through the canvas and extended around the edges of the shield plates, and thence around the eyed shanks 40. This canvas 41 has sewed to its outer side, by means of a thread 43, a twine or small rope 44, consisting of a plurality of strands, as clearly shown in Fig. 4. This cord or small rope, as will be seen, bears against the center of the metallic shield, and consequently tends to maintain said shield in its curved form, or in other words, prevents undue straightening out or flattening of the shield.

The outer looped or doubled edges of the two inner thicknesses of canvas 16 and 17, respectively, are secured together by hooks and eyes 45 and 46, and in order to prevent these hooks and eyes from coming in direct contact with the inner rubber tubing 15, I provide a doubled flap 47 interposed between the inner canvas thickness 16 and the rubber tubing 15 at the joint where the hooks and eyes are located, one edge of said flap being stitched by a stitch line 48, and the opposite edge being left free.

In order to more securely hold the doubled over outer edges of the canvas 23, the leather thread covering 31, the metallic shield 32, and the canvas layer 41 together, I provide cords 49, which are passed through the eyes of the shanks 40, after said eyes have been turned at right angles to the length of the slots 30. The ends of these cords may be knotted, as shown in Fig. 1, in order to retain them in place.

The canvas which I employ to form the different layers hereinbefore referred to, is preferably coated with a composition of combined tar and linseed oil heated to a desirable degree, and then thinned with some suitable material. A coating of this character will act effectually to prevent rotting of said canvas layers.

In the operation of gaining ready access to the interior of the tire, particularly to the inner rubber tube 15, all that is necessary is to remove the cords 49 from the eyes of the shanks 40 projecting from some of the shield segments, and then turn the eyes of the shanks 40 so that said eyes will lie in the direction of the length of the eyelets 30. The outer leather tread covering 31, and the interior parts connected thereto, can then be readily withdrawn from connection with the canvas 23, and pushed to one side, and this will permit the hooks and eyes 45 and 46 to be readily disengaged. Also, at the points where the tire is connected to the rim 14, the nuts 27 may be loosened by removing the plates 29, and then turning said nuts in the proper direction. This will permit of the loosening of the tire where said tire engages the rim. It is furthermore obvious that any particular shield section or sections may be removed at any time by drawing out the cords 49 from the eyes of the shanks 40 of the particular plate or section desired to be removed, then turning the eyes of the shanks in the direction of the length of the eyelets 30 thereby permitting the shanks to be disengaged from the canvas 23 and accessibility afforded to the shield segments or sections.

From the foregoing description of my invention, it will be seen that I provide a construction which is practically puncture proof, is easy and quick of adjustment, can be rapidly repaired in a simple manner, and that also the construction is such that the parts necessary for repair can be conveniently carried along by the user of a vehicle equipped with my tires. Further, this puncture-proof tire automatically adjusts itself to different sizes and demands for use, and the construction is such that the inner rubber tube can be removed for repair or substitution without taking the wheel off the vehicle, which is particularly advantageous where a wheel is mounted in a fork, or other device, as in the case of a bicycle, motor cycle, etc. Furthermore, the inside rubber tube can be removed and replaced and other work done with almost any form of tool; in other words, no special form of tool is necessary. A still further advantage of my invention resides in the easy riding which the construction affords, by reason of the fact that the rubber inflated tube does not come directly in contact with the ground, and hence the resisting suction which is encountered in a wheel having the rubber tube so located is avoided in my construction, and also the tire in my construction preserves its roundness. Easy riding is characteristic of the use of my tire on account of its great flexibility. In fact, a tire constructed in accordance with my invention secures the same amount of resiliency as an ordinary automobile tire, and at the same time it is cheaper to construct, the latter being true by reason of the fact that it is not necessary to provide as thick rubber for the inflatable tube.

In the modified construction illustrated in Fig. 12, the thickness of canvas 17 is in one piece with the outer canvas 23, and instead of being provided with openings for eyelets 26, as in the principal form of construction, the canvas is separated at the depression 25 of the rim, leaving a continuous space entirely around the tire, this space being sufficiently wide for the accommodation of the nuts 21'. In the loops formed at these separated edges of the canvas layers 17 and 23, cords 50, 50 are inserted, which cords not only stiffen the edges, but also form enlargements which abut against shoulders 51, 51 formed by the sides of the recess 25 of the rim.

In Fig. 13, I show a modified construction of the shield plates 32, wherein instead of employing loops 38 for the tongues 37, I employ bifurcated tongues 52 projecting from one end of each plate, the furcate members of said tongues straddling additional eyed shanks similar to shanks 40', and which shanks are adapted to be turned across the space between the furcate members, and to also receive therethrough the cords 49.

What I claim as my invention is:

1. In a pneumatic tire, the combination with an inner inflatable tube, of a shield encircling the tube around the tread portion of the tire, said shield comprising a series of overlapping flexible puncture-proof sections detachably connected together by means of bails, and each section at one edge provided with tongues adapted to slidingly engage portions of the next adjacent section.

2. In a pneumatic tire, the combination of an inner inflatable tube, a shield encircling the tube around the tread portion of the tire, said shield comprising a series of overlapping flexible puncture-proof sections detachably connected together, and each section at one edge provided with projecting bifurcated tongues, and turnable shanks projecting from the shield sections and provided at their outer ends with enlargements, and which shanks the furcate members of the tongues are adapted to straddle, and the heads of the said shanks, when the shanks are turned in one direction, adapted to be brought athwart of the spaces between the furcate members of the tongues.

3. In a pneumatic tire, the combination of an inner inflatable tube, a shield encircling the tube around the tread portion of the tire, said shield comprising a series of overlapping flexible puncture-proof sections, bails pivoted to each shield section, the looped end of one bail adapted to engage under the pivoted end of the next bail, just in advance of the pivot of said latter bail.

4. In a pneumatic tire, the combination of an inner inflatable tube, a shield encircling the tube around the tread portion of the tire, said shield comprising a series of overlapping flexible puncture-proof sections, bails detachably pivoted to each shield section, the looped end of one bail adapted to engage under the pivoted end of the next bail, just in advance of the pivot of said next or adjacent bail.

5. In a pneumatic tire, the combination of an inner inflatable tube, a shield encircling the tube around the tread portion of the tire, said shield comprising a series of overlapping flexible puncture-proof sections, each section provided near one edge with a raised portion having inclined openings at opposite ends thereof, the edges of said openings below the raised portion provided with stops or catches, a bail for each section, the ends of each bail being bent at substantially right angles to the inclined openings, and adapted to be inserted through said openings and to engage against the stops or catches to form a detachable pivotal connection, and the looped end of one bail adapted to engage under the pivoted end of the next bail, just in advance of the pivot of said next bail.

6. In a pneumatic tire, the combination of an inner inflatable tube, a shield encircling the tube around the tread portion of the tire, said shield comprising a series of overlapping flexible sections, each section provided near one edge with a raised portion having inclined openings at opposite ends thereof, the edges of said openings below the raised portion provided with stops or catches, a bail for each section, the ends of each bail being bent at substantially right angles with the inclined openings, and adapted to be inserted through said openings and to engage against the stops or catches to form a detachable pivotal connection, and the looped end of one bail adapted to engage under the pivoted end of the next adjacent bail just in advance of the pivot of said adjacent bail, and guards beneath the shield sections, each guard being so located as to cover the engaging bent ends of the bail which lie beneath the shield section and thereby protect the portion of the tire thereunder beneath from injury by contact therewith of the shield sections.

7. In a pneumatic tire, the combination of an inner inflatable tube, a shield encircling the tube around the tread portion of the tire said shield comprising a series of overlapping flexible puncture-proof sections, detachably and slidably connected together, eyed shanks projecting from the shield sections and constructed to detachably connect said shield sections to the tire; and cords passed through the eyes of said shanks.

8. In a pneumatic tire, the combination of an inner inflatable tube, coverings of suitable material surrounding said tube, a clamping band of metal around the inner portion of said tire and disposed between layers of the coverings, said band composed of a series of overlapping flexible sections, a rim to which the inner portion of the tire is fitted, elongated nuts fitting and secured in openings in the rim, screw-bolts engaging the nuts and extending through openings or spaces in the coverings, and having their outer ends engaging registering openings in the overlapping portions of the band sections, the outer ends of said screw bolts provided with heads bearing against the outer side of the clamping bands, and nuts turned on the screw-bolts against the opposite side of the clamping band.

9. In a pneumatic tire, the combination of an inner inflatable tube, coverings of suitable material surrounding said tube, a clamping band of metal around the inner portion of the tire and disposed between layers of the coverings, said band composed of a series of overlapping flexible sections, a rim to which the inner portion of the tire is fitted, elongated nuts fitted in openings in the rim, each nut provided with an annular recess, screw-bolts engaging the nuts and extending through openings or spaces in the coverings, and having their outer portions engaging registering openings in the overlapping portions of the band sections, and their outer extremities provided with heads bearing against the outer side of the clamping band, nuts turned on the screw-bolts against the opposite side of the clamping band, and bifurcated plates having the furcate members thereof engaging the recesses of the elongated nuts, and the ends of the furcate members bent outwardly and driven into the rim.

10. In a pneumatic tire, the combination of an inner inflatable tube, coverings of suitable material surrounding said tube, a clamping band of metal around the inner portion of said tire and disposed between layers of the coverings, said band composed of a series of overlapping flexible sections, an additional covering for the clamping band, a rim to which the inner portion of the tire is fitted, said rim provided with openings, elongated nuts fitting and secured in said rim openings, screw-bolts engaging the nuts and extending through openings or spaces in the coverings, and having their outer ends engaging registering openings in the overlapping portions of the band sections, the outer ends of said screw-bolts provided with heads bearing against the outer side of the clamping band, and nuts turned on the screw-bolts against the opposite side of the clamping band.

11. In a pneumatic tire, the combination of an inner inflatable tube, coverings of suitable material surrounding said tube, a clamping band of metal surrounding the inner portion of said tire and disposed between layers of the coverings, said band composed of a series of overlapping flexible sections, the overlapping portions provided with square openings, a rim to which the inner portion of the tire is fitted, said rim provided with openings, elongated nuts fitting and secured in said rim openings, screw-bolts engaging the nuts and extending through openings or spaces in the coverings, the threads of said bolts, at diametrically opposite sides of the bolts, being interrupted to form square surfaces, and the outer ends of said bolts engaging the registering square openings of the overlapping portions of the sections of the clamping band, and the outer extremity of said screw-bolts provided with heads bearing against the outer side of the clamping band, and nuts turned on the screw-bolts against the opposite side of the clamping band.

12. In a pneumatic tire, the combination of an inner inflatable tube, coverings of suitable material surrounding said tube, a clamping band of metal surrounding the inner portion of said tire and disposed between layers of the coverings, said band composed of a series of overlapping flexible sections, the overlapping portions provided with elongated rectangular openings, a rim to which the inner portion of the tire is fitted, said rim provided with openings, elongated nuts fitting and secured in the rim openings, screw-bolts engaging the nuts and extending through openings or spaces in the coverings, the threads of the bolts, at diametrically opposite sides of said bolts, being interrupted to form square surfaces, and the outer ends of the bolts engaging the registering elongated openings of the overlapping portions of the sections of the clamping band, and the outer extremities of said bolts provided with heads bearing against the outer side of the clamping band, and nuts turned on the screw-bolts against the opposite side of the clamping band.

13. In a pneumatic tire, the combination of an inner inflatable tube, a covering of suitable material for said tube comprising an inner and an outer portion, the edges of the inner portion of the covering meeting at the tread portion of the tire, releasable securing means for connecting the edges of the inner portion of the covering together, flaps forming part of the outer covering, a flexible puncture proof shield encircling the inner portion of the covering around the tread portion of the tire, and securing means connected to said shield which pass through openings provided therefor in the flaps for releasably connecting the shield to the covering.

14. In a pneumatic tire, the combination of an inner inflatable tube, an outer covering partially covering the tube, the outer edges of said covering being spaced a considerable distance apart, and said outer edges being provided with elongated eyelets, a punctureproof flexible shield encircling the tube around the tread portion of the tire, and shanks rotatably secured to the shield and extending through the eyelets, the outer ends of the shanks provided with enlargements adapted, upon the turning of the shanks, to be brought athwart of the length of the eyelets.

15. In a pneumatic tire, the combination of an inner inflatable tube, an outer covering partially covering the tube, the outer edges of said covering being spaced a considerable distance apart, and said outer edges being provided with elongated eyelets, a punctureproof flexible shield encircling the tube around the tread portion of the tire, shanks rotatably secured to the shield and extending through the eyelets, the outer ends of said shanks provided with eyes adapted, upon the turning of the shanks, to be brought athwart of the length of the eyelets, and cords passing through the eyes of the shanks.

16. In a pneumatic tire, the combination of an inner inflatable tube, an outer covering partially covering the tube, the outer edges of said covering being spaced a considerable distance apart, and said outer edges being provided with elongated eyelets, a puncture-proof flexible shield encircling the tube around the tread portion of the tire, an outer covering for the shield at the tread portion of the tire, and shanks rotatably secured to the shield and extending through the tread covering and through the eyelets of the outer covering, the outer ends of said shanks provided with enlargements adapted, upon the turning of the shanks, to be brought athwart of the length of the eyelets.

In testimony whereof, I affix my signature, in presence of two witnesses.

LOUIS J. WESTNESS.

Witnesses:
A. L. MORSELL,
ANNA F. SCHMIDTBAUER.